United States Patent Office 3,449,352
Patented June 10, 1969

3,449,352
SYNTHESIS OF 2-TRIFLUOROMETHYLBENZIMID-
AZOLES AND 2-TRIFLUOROMETHYLIMIDAZO-
PYRIDINES
John Frederick Harris, Meldreth, near Royston, England,
assignor to Fisons Pest Control Limited, Harston,
England
No Drawing. Filed Apr. 27, 1967, Ser. No. 634,113
Claims priority, application Great Britain, May 4, 1966,
19,664/66
Int. Cl. C07d 49/38, 57/04
U.S. Cl. 260—309.2                            8 Claims

ABSTRACT OF THE DISCLOSURE

A process for the manufacture of a compound of the formula:

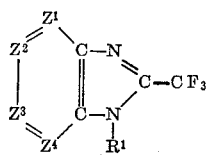

wherein $R^1$ is selected from the group consisting of H, a lower alkyl group and —$COOR^6$, where $R^6$ is selected from the group consisting of alkyl, substituted alkyl, aryl and substituted aryl; wherein one of $Z^1$, $Z^2$, $Z^3$ and $Z^4$ is selected from the group consisting of a nitrogen atom and the group $CR^2$ and the remainder of $Z^1$, $Z^2$, $Z^3$ and $Z^4$ are the groups $CR^3$, $CR^4$ and $CR^5$; wherein $R^2$, $R^3$, $R^4$ and $R^5$ are selected from the group consisting of H, alkyl, hydroxy, alkoxy, nitro, halogen, pseudo-halogen, substituted alkyl, carboxy, amino, mono-substituted amino, di-substituted amino, thiolo and sulpho, which comprises reacting the corresponding 1,2-phenylene diamine, 2,3-pyridine diamine and 3,4-pyridine diamine with trifluoroacetic acid, distilling off the formed water in the presence of a water immiscible solvent, condensing the aqueous distillate, recovering the trifluoroacetic acid from the aqueous distillate, and returning this to the process.

The present invention relates to an improved process for the manufacture of 2-trifluoromethylbenzimidazoles and 2-trifluoromethylimidazopyridines.

A process for the manufacture of compounds of this type by the reaction of the appropriate substituted diamine with trifluoroacetic acid is known. It is, however, difficult to operate this process on account of losses of trifluoroacetic acid, which is a very expensive reactant. It has now been found that the yields based on trifluoroacetic acid may be greatly increased by distilling off the formed water in the presence of a water immiscible solvent during or after the reaction, recovering the trifluoroacetic acid from the aqueous distillate and returning this to the process.

Accordingly the present invention is for a process for the manufacture of 2-trifluoromethylbenzimidazoles and 2-trifluoromethylimidazopyridines which comprises reacting the corresponding 1,2-phenylene diamine or 2,3- or 3,4-pyridinediamine with trifluoroacetic acid in the presence of a water immiscible solvent, distilling off the formed water in the presence of a water immiscible solvent during or at the end of the reaction, condensing the from the aqueous distillate and returning this to the aqueous distillate, recovering the trifluoroacetic acid process. The water immiscible solvent may be present throughout the reaction or may be introduced when the distillation is going to be carried out.

The 2-trifluoromethylbenzimidazoles and 2-trifluoromethylimidazopyridines may be unsubstituted or substituted in the 1, 4, 5, 6 and 7 positions. These compounds are suitably of the formula:

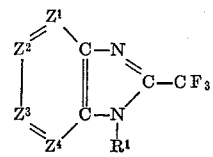

wherein $R^1$ is H, a lower alkyl group or —$COOR^6$, where $R^6$ is alkyl (for example of 1–6 carbon atoms, such as methyl, ethyl or propyl), substituted alkyl (for example chloromethyl or bromoethyl), aryl (for example phenyl or naphthyl) or substituted aryl (for example tolyl or xylyl), wherein one of $Z^1$, $Z^2$, $Z^3$ and $Z^4$ is a nitrogen atom or a group $CR^2$ and the remainder of $Z^1$, $Z^2$, $Z^3$ and $Z^4$ are the groups $CR^3$, $CR^4$, and $CR^5$; wherein $R^2$, $R^3$, $R^4$ and $R^5$ are the same or different and are selected from the group comprising H, alkyl (for example 1–6 carbon atoms such as methyl, ethyl or propyl), hydroxy, alkoxy (for example methoxy, ethoxy, or butoxy), nitro, halogen (for example chloro or bromo), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, amino or mono- or di-substituted amino (for example methylamino, dimethylamino, acetylamino, trifluoroacetylamino), thiolo and sulpho.

The process is of particular application in the manufacture of 4,5-dichloro-2-trifluoromethylbenzimidazole.

The water immiscible solvent which is employed may be of various types, and examples which may be mentioned include 1,2,3-trichlorobenzene, 1,2,4-trichlorobenzene, xylene, tetrachloroethylene and methylene chloride.

It is preferred to distill off the formed water during the reaction.

The distilled off trifluoroacetic acid may be recovered from the aqueous distillate in a number of ways. According to one embodiment of the invention, the 1,2-phenylene diamine or the 2,3- or 3,4-pyridinediamine employed is added to the aqueous distillate in at least the stoichiometric amount so as to form a salt with the trifluoroacetic acid. The salt may then be recovered from the aqueous distillate by adding a water immiscible solvent and distilling off the water, or by simple evaporation to obtain the solid salt, or by precipitation of the salt from the aqueous solution by the addition of other solutes, such as sodium chloride. The sodium chloride is suitably added as a saturated aqueous solution. According to another embodiment of the invention, the trifluoroacetic acid may be separated from the aqueous distillate by solvent extraction.

According to another embodiment of the invention, the aqueous distillate is mixed with a non-volatile strong acid, and the mixture distilled. The first distillate fraction is approximately 95% by weight trifluoroacetic acid; later fractions are more dilute acid, and finally water; the residue is the non-volatile strong acid of the original concentration, which may be re-used in the process. The first distillate fraction is suitable for recycle to the process; the more dilute fractions may be subjected to further distillation. Suitable non-volatile strong acids include for example sulphuric acid and phosphoric acid. It is preferred to use sulphuric acid of between 70% and 90% by weight concentration as the non-volatile strong acid.

The separated salt of trifluoroacetic acid with the diamine, as a solid or as an organic solvent solution, or the separated organic solvent solution of trifluoroacetic acid, obtained as indicated, may be recycled to the first stage of the process.

The following examples are given to illustrate the present invention.

Example 1

14.0 grams of 3,4-dichloro-1,2-phenylene diamine (0.079 mole) was dissolved in 142 millilitres of mixed xylenes and to this solution was added 12 millilitres of 97% trifluoroacetic acid (0.153 mole). The solution was refluxed for one hour. The aqueous layer was then distilled off and the xylene solution refluxed for a further 2.25 hours, the hot condensed solvent being passed through the aqueous layer before being returned to the reaction vessel.

75 millilitres of xylene was distilled off from the reaction mixture and the remaining solution was extracted with 35 millilitres of 3 N sodium hydroxide solution. The alkaline aqueous phase was acidified with hydrochloric acid (d 1.18) giving 18.97 grams of crude 4,5-dichloro 2-trifluoromethyl benzimidazole, melting point 205–206° C. (94% yield on diamine).

Analysis of the distillate aqueous layer after reaction showed it to contain 0.064 mole trifluoroacetic acid. This was added to a solution of 14 grams of 3,4 dichloro-1,2-phenylene diamine (0.079 mole) dissolved in 142 ml. of mixed xylenes, and the water distilled off as before.

The resulting solution of the amine salt of trifluoroacetic acid in xylenes, contained the major part of the trifluoroacetic acid, and was recycled to the first stage of the process. The separated water layer contained only 0.0048 mole of trifluoroacetic acid.

The yield of 4,5-dichloro-2-trifluoromethyl benzimidazole based on trifluoroacetic acid was 94%.

Example 2

The process of Example 1 was repeated, producing the aqueous distillate containing 0.064 mole of trifluoroacetic acid. To this solution was added 14 grams of 3,4-dichloro-1,2-phenylene diamine, and after a few minutes saturated sodium chloride, precipitating the salt of trifluoroacetic acid and the diamine. Only 2.8% of the trifluoroacetic acid remained in solution.

The separated salt of the diamine with trifluoroacetic acid was recycled to the first stage of the process.

Example 3

The process of Example 1 was repeated, producing the aqueous distillate containing 0.064 mole of trifluoroacetic acid. To this solution was added 14 grams of 3,4-dichloro-1,2-phenylene diamine, and the resulting solution evaporated to dryness. The formed solid salt of the diamine and trifluoroacetic acid was recycled to the first stage of the process.

Example 4

The process of Example 1 was repeated, producing the aqueous distillate containing 0.064 mole of trifluoroacetic acid. To this solution was added an equal volume of 80% by weight sulphuric acid, and the resulting mixture distilled. The distillate was collected in four fractions, as follows:

| Fraction | Concentration of trifluoroacetic acid, percent by wt. | Percent of trifluoroacetic acid present in distillate |
|---|---|---|
| 1 | 96 | 70 |
| 2 | 86 | 20 |
| 3 | 45 | 9 |
| 4 | 0.2 | 1 |

The first fraction was recycled to the first stage of the process.

Example 5

4.37 mls. (0.0176 mole) of 4.08 N trifluoroacetic acid was added to a stirred mixture of 3,59 g. (0.025 mole) of 5-chloro-2,3-diaminopyridine in 60 ml. of tetrachloroethylene. A heavy precipitate of the substituted pyridine-trifluoroacetic acid salt was formed. The solution was refluxed and the distillate was returned through a Dean & Stark tube, the aqueous layer in the distillate being retained in the Dean & Stark tube. Analysis of the water layer after distillation showed it to contain 0.000145 mole of trifluoroacetic acid (0.83%), the remainder being retained as anhydrous substituted pyridine—trifluoroacetic acid salt.

Example 6

8 kg. 4,5-dichloro-1,2-phenylene diamine was suspended in 80 litres of commercial xylene and 5.6 litres of 97% trifluoroacetic acid was added. The mixture was refluxed with agitation for four hours and the aqueous layer was distilled off.

40 litres of xylene was distilled off from the reaction mixture and the remaining solution was allowed to cool and crystallise. The product, 5,6 - dichloro-2-trifluoromethylbenzidazole was filtered off and dried. Yield 9.934 kg. (86.3% yield on diamine) M.P. 239–241° C.

240 kg. of an aqueous solution of trifluoroacetic acid containing 38.7 kg. of trifluoroacetic acid, which was recovered from the above preparation and other similar preparations, was added to 136 litres of sulphuric acid S.G. 1.98. The mixture was distilled to give the following fractions:

Fraction 1—47.25 kg. containing 42.8 kg. trifluoroacetic acid.
Fraction 2—30.0 kg. containing 31.7 kg. trifluoroacetic acid.
Fraction 3—16.6 kg. containing 9.54 kg. trifluoroacetic acid.

The aqueous sulphuric acid residue contained only 1 kg. of trifluoroacetic acid.

Fractions 1 and 2 were recycled to the first stage of the process; Fraction 3 was subjected to a further distillation from sulphuric acid.

We claim:
1. A process for the manufacture of a compound of the formula:

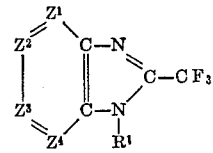

wherein $R^1$ is selected from a group consisting of H, lower alkyl, and —$COOR^6$, where $R^6$ is alkyl of 1 to 6 carbon atoms, halo(lower)alkyl, phenyl, naphthyl or lower alkylphenyl; wherein one of $Z^1$, $Z^2$, $Z^3$ and $Z^4$ is a nitrogen atom of the group $CR^2$ and the remainder of $Z^1$, $Z^2$, $Z^3$ and $Z^4$ are the groups $CR^3$, $CR^4$ or $CR^5$; and wherein $R^2$, $R^3$, $R^4$ and $R^5$ are H, alkyl of 1 to 6 carbon atoms, hydroxy, lower alkoxy, nitro, halogen, cyano, halo(lower)alkyl, hydroxy(lower)alkyl, lower alkoxy (lower)alkyl, carboxy, amino, mono-lower alkyl-substituted amino, di-lower alkyl-substituted amino, thiolo or sulpho, which comprises reacting the corresponding 1,2-phenylene diamine, 2,3-pyridine diamine and 3,4-pyridine diamine with trifluoroacetic acid, distilling off the formed water in the presence of a water immiscible solvent, condensing the aqueous distillate, recovering the trifluoroacetic acid from the aqueous distillate, and returning this to the process.

2. In a process for the manufacture of 2-trifluoromethylbenzimidazole or 2-trifluoromethylimidazopyridine by the reaction of a corresponding 1,2-phenylene diamine, 2,3-pyridine diamine or 3,4-pyridine diamine with trifluoroacetic acid with formation of water, the improvement according to which the water is distilled off from the reaction mixture in the presence of a water immiscible solvent, the resultant aqueous distillate is condensed, recovering trifluoroacetic acid from said aqueous distillate, and returning the recovered trifluoroacetic acid from said aqueous distillate, and returning the recovered trifluoroacetic acid for use in the initial reaction step, whereby the objective compound is produced in high yield based on trifluoroacetic acid.

3. The improvement as claimed in claim 2 wherein the water immiscible solvent is selected from the group consisting of 1,2,3-trichlorobenzene, 1,2,4-trichlorobenzene, xylene, tetrachloroethylene and methylene chloride.

4. The improvement as claimed in claim 2 in which the formed water is distilled off during the reaction.

5. The improvement as claimed in claim 2 in which the trifluoroacetic acid is recovered from the aqueous distillate by adding thereto at least the stoichiometric amount of the compound selected from the group consisting of 1,2-phenylene diamine, 2-3-pyridine diamine and 3-4-pyridine diamine employed in the process so as to form the corresponding salt, which is then separated.

6. The improvement as claimed in claim 2 wherein the trifluoroacetic acid is recovered from the aqueous distillate by solvent extraction.

7. The improvement as claimed in claim 2 wherein the trifluoroacetic acid is recovered from the aqueous distillate by mixing the aqueous distillate with a non-volatile strong acid and distilling into fractions, the fraction rich in trifluoroacetic acid being recycled to the first stage of the process and the fraction poor in trifluoroacetic acid being subjected to further distillation.

8. The improvement as claimed in claim 2 wherein 3,4-dichloro-1,2-phenylene diamine is reacted with trifluoroacetic acid.

References Cited

UNITED STATES PATENTS

| | | | |
|---|---|---|---|
| 2,459,941 | 1/1947 | Holbro et al. | 260—309.2 |
| 2,497,309 | 2/1950 | Larson et al. | 260—309.7 |
| 2,504,431 | 4/1950 | Loder | 260—309.7 |
| 2,530,349 | 11/1950 | Craig | 260—309.2 |
| 2,935,514 | 5/1960 | Hoffman et al. | 260—309.2 |
| 3,010,967 | 11/1961 | Siegrist et al. | 260—309.2 |
| 3,179,669 | 4/1965 | Ursprung | 260—309.2 |

FOREIGN PATENTS 659,384  8/1965  Belgium.

OTHER REFERENCES

Netherlands Application 6,414,890 June 1965, 11 pages spec. and 1 page drawing.

Smith et al.: Jour. Amer. Chem. Soc., vol. 75, pp. 1292–4.

Wright et al.: Chem. Rev., vol. 48, pp. 397–408 (1951).

NORMA S. MILESTONE, *Primary Examiner.*

NATALIE TROUSOF, *Assistant Examiner.*

U.S. Cl. X.R.

260—294.8, 294.9, 295, 296